United States Patent

[11] 3,570,541

| [72] | Inventors | Maurice F. Franz<br>East Peoria;<br>Philip S. Webber, Morton, Ill. |
|---|---|---|
| [21] | Appl. No. | 779,903 |
| [22] | Filed | Nov. 29, 1968 |
| [45] | Patented | Mar. 16, 1971 |
| [73] | Assignee | Caterpillar Tractor Co.<br>Peoria, Ill. |

[54] THREE-WAY DIRECTIONAL CONTROL VALVE
15 Claims, 4 Drawing Figs.

[52] U.S. Cl. ............................................................ 137/625.66
[51] Int. Cl. .................................................................. F16k 11/02
[50] Field of Search .......................................... 137/625.25,
625.26, 625.27, 625.61, 625.48, 625.64, 625.66,
413; 251/61.1, 333

[56] References Cited
UNITED STATES PATENTS

| 862,867 | 8/1907 | Eggleston | 251/61.1UX |
| 1,302,538 | 5/1919 | Gulick | 137/413 |
| 2,123,814 | 7/1938 | Summers | 137/625.27 |
| 2,782,801 | 2/1957 | Ludwig | 137/625.48 |
| 2,881,788 | 4/1959 | Johnson | 251/333X |
| 2,927,737 | 3/1960 | Zeuch et al. | 251/333X |
| 2,998,024 | 8/1961 | Marette et al. | 137/625.27 |
| 3,244,193 | 4/1966 | Loveless | 137/625.27X |
| 2,297,535 | 9/1942 | Bryant | 251/333 |
| 2,460,867 | 2/1949 | Zimmerman | 251/333X |
| 3,384,122 | 5/1968 | Harpman | 137/625.64 |

FOREIGN PATENTS

| 198,785 | 10/1938 | Switzerland | 251/333 |

Primary Examiner—Henry T. Klinksiek
Attorney—Fryer, Tjensvold, Feix, Phillips & Lempio ABSTRACT: A three-way directional control valve comprises a poppet member reciprocally mounted therein to selectively communicate the working port of a fluid actuated device with either a pressurized fluid source or exhaust. The poppet member comprises at least one annular, elastomeric member secured thereon to form spaced seating surfaces adapted to engage respective seats to effect such selective communication.

A three-way directional control valve functions to either pressurize or exhaust the working port of a fluid actuated device. The valve's durability, leakage rate and ability to quickly respond upon actuation comprise primary design problems. In addition, the valve must normally be designed to adapt it for integration into rather complex fluid circuit combinations.

Patented March 16, 1971 3,570,541
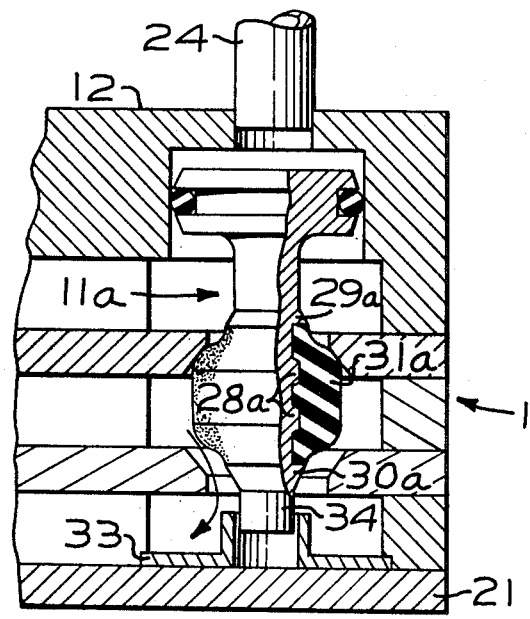
INVENTORS
MAURICE F. FRANZ
PHILIP S. WEBBER
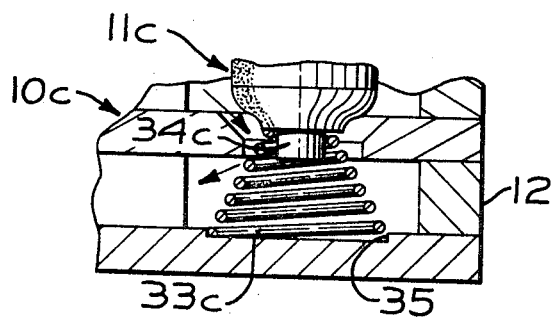
ATTORNEYS

THREE-WAY DIRECTIONAL CONTROL VALVE

An object of this invention is to overcome the above, briefly described problems by providing a durable, economical and noncomplex directional control valve. The valve is preferably of the three-way type and exhibits self-aligning characteristics, a low leakage rate and ability to quickly respond when actuated.

A novel aspect of this invention comprises the utilization of at least one annular, elastomeric member attached to a reciprocal valve poppet member to form first and second seating surfaces thereon. Such seating surfaces are positioned between two juxtaposed and diverging seats to selectively communicate fluid pressure to and from a working port of a fluid actuated device.

Another novel aspect of this invention comprises the utilization of a laminated housing construction for the valve to greatly reduce the valve's manufacturing costs and to facilitate its assembly and servicing.

Other objects of this invention will become apparent from the following description and accompanying drawings wherein;

FIG. 1 is a cross-sectional view of a three-way directional control valve embodying novel aspects of this invention; and FIGS. 2—4 illustrate modified versions of the FIG. 1 directional control valve.

Referring to FIG. 1, a control valve 10 comprises a valve or poppet member 11 reciprocally mounted in a laminated housing 12 for selectively communicating a working port 13 with either an inlet port 14 or an exhaust port 15. The working port may in turn communicate with any suitable fluid actuated device, such as a pump, motor or clutch piston. The housing preferably comprises a plurality of stacked members 16—20 adapted to be welded, bolted or otherwise suitably secured together in the integrated manner illustrated. Such a laminated housing construction is economical and facilitates expeditious assembly and servicing.

Members 17 and 19 have conically shaped seats 22 and 23 formed thereon, respectively. The seats are juxtaposed and diverge toward each other in contrast to conventional seats of this type which are normally arranged in a converging relationship. A conduit or inlet means 24 is attached to member 16 of the housing to selectively communicate a pilot or valve actuating fluid pressure to a control chamber 25 by suitable control means (not shown). Such fluid pressure is preferably pneumatic or hydraulic.

The poppet member has a piston 26 attached to one end thereof having a conventional O-ring seal 27 seated in a circular groove formed therein for isolating chamber 25 from port 14. A radial flange 28 is formed on the other end of the poppet member and cooperates with smaller flanges 29 and 30 to aid in retaining annular, elastomeric means shown as comprising members 31 and 32 fixed in position on the poppet member. The seating members may comprise an elastomeric material, such as natural rubber having a durometer hardness approximating 90, bonded or otherwise suitably attached to the spool.

For example, the members may comprise an inside diameter slightly less than the outside diameter of the engaging surface portions of the poppet member. Upon assembly, the elastomeric members are stretched over the poppet member and automatically contract into a tight fitting relationship thereon. Each elastomeric member may comprise a conically shaped seating surface forming an included angle $a$, preferably selected from a range of from 50° to 120° and shown in FIG. 1 as closely approximating 80°.

Conically shaped seating means 22 and 23 each comprise an included angle $b$, preferably selected from a range of from 60° to 130° and shown as approximating 90° to provide a maximum flow area therethrough for a minimum stroke. Angle $a$ is preferably maintained slightly less (e.g., 10°) than angle $b$ so that the seating relationship between seat 24 and member 31, for example, occurs at a small diameter of the conically shaped seat (FIG. 1). The inherent resiliency of each elastomeric member further assures a positively sealed seating action.

During the illustrated nonactuated condition of operation operating pressure approximating 100 p.s.i., for example, is prevalent in inlet port 14 to urge spool 11 upwardly. Member 31 preferably engages seat 22 to provide a line, sealing contact therebetween. Such upward urging of the poppet member is effected since piston 26 comprises an effective area greater than the effective area of the poppet member which is subjected to the inlet pressure. During such condition of operation working port 13 of the fluid actuated device is communicated with drain or exhaust port 15.

Thus, the net or differential force is one which tends to urge the poppet member upwardly. When conduit 24 communicates a pilot pressure of 70 p.s.i., for example, to chamber 25 poppet member 11 moves downwardly to engage member 32 with seat 23. The communication between ports 13 and 15 is cut off and port 13 is simultaneously communicated with inlet port 14. Thus, pressurized air, for example, will be communicated to the working port and to the actuated device.

FIGS. 2—4 illustrate various modifications which may be made to the above-described valve. Identical numerals appearing in FIGS. 1—4 depict corresponding structures with numerals depicting modified structures in FIGS. 2—4 being accompanied by subscripts $a$, $b$ and $c$, respectively.

FIG. 2 discloses a modified valve 10$a$ comprising a poppet member 11$a$ wherein the elastomeric means comprises single member 31$a$ secured thereon. The elastomeric member may be arranged in the manner shown to surround flanges 28$a$ and to axially abut spaced flanges 29$a$ and 30$a$. In addition, guiding and centering means, comprising a cup 33 secured to member 21 of housing 12, receives an extension 34 of the poppet member therein. The seating surfaces formed on the elastomeric member are spherical rather than conical (FIG. 1) to assure a line, seating contact even though the spool member becomes slightly misaligned.

FIG. 3 illustrates a modified valve 10$b$ similar to the FIG. 2 valve except that the guiding and centering means comprises a bore 33$b$ formed in member 21 of housing 12. In addition, a stem portion 34$b$ of a poppet member 11$b$ has been elongated to be received in such recess.

FIG. 4 illustrates a modified valve 10$c$ wherein the guiding and centering means comprises a conically shaped coil spring 33$c$. The apex portion of the spring surrounds an extension 34$c$ of the poppet member. A recess 35 may be formed in plate member 21 to receive the base portion of the spring therein. The spring further functions as a biasing means to urge poppet member 11$c$ upwardly to its normal, exhaust position illustrated in FIGS. 1 and 2, for example. Such a biasing means could comprise other forms such as a cantilevered leaf spring secured to the housing and arranged to engage the lower end of stem 34$c$.

We claim:

1. A directional control valve comprising:
   a housing having consecutive first, second and third ports defined therein;
   a first conically shaped seating means located between said first and second ports;
   a second conically shaped seating means located between said second and third ports and disposed in juxtaposed and diverging relationship relative to said first conically shaped seating means;
   a poppet member reciprocally mounted in said housing in unattached and self-aligning relationship therewith for selectively communicating said second port with either said first or third port;
   said poppet member comprising annular, elastomeric means attached thereto forming first and second annular seating surfaces located between and adjacent to said first and second conically shaped seating means, respectively; and
   a single piston secured to one end of said poppet member in axial alignment therewith and defining a control chamber with said housing separated from said first port by said piston and inlet means for selectively communicating a pilot fluid pressure to said control chamber for selectively moving said poppet member, said piston having an elastomeric O-ring sealing means mounted thereon for isolating said control chamber from said first port, said poppet member freely rockable in said housing about said O-ring whereby said seating surfaces align with their respective seating means.

2. The invention of claim 1 wherein said housing comprises a plurality of stacked, parallel members secured together, said first and second conically shaped seating means each formed on a separate member.

3. The invention of claim 1 wherein each of said first and second annular seating surfaces is conically shaped.

4. The invention of claim 3 wherein the included angle of each of said conically shaped, annular seating surfaces is selected from a range of from 50 to 120° and each of said conically shaped, annular seating means is selected from a range of from 60 to 130°.

5. The invention of claim 4 wherein the included angle of each of said conically shaped, annular seating surfaces is slightly less than the included angle of each of said conically shaped, annular seating means.

The invention of claim 1 wherein each of said first and second annular seating surfaces is spherically shaped.

7. The invention of claim 1 wherein said poppet member further comprises at least one radial flange formed thereon and positioned between said first and third ports to engage and be completely encapsulated by portions of said annular elastomeric means for aiding in the retention thereof on said poppet member.

8. The invention of claim 7 wherein said annular elastomeric means comprises first and second annular members separated by said radial flange on said poppet member, said first and second annular seating surfaces respectively formed on said first and second annular members.

9. The invention of claim 8 wherein each of said first and second annular seating surfaces is conically shaped and forms an included angle slightly less than the included angle formed by each of said first and second conically shaped seating means.

10. The invention of claim 8 wherein said annular elastomeric means comprises a single annular member circumventing and encapsulating said radial flange.

11. The invention of claim 1 wherein one end of said spool terminates substantially at said second conically shaped seating means.

12. The invention of claim 1 wherein one end of said spool has an extension forming a stem portion which extends past said second conically shaped seating means and further comprising guide means engaging said stem portion for guiding and centering said spool during actuation thereof.

13. The invention of claim 12 wherein said guide means comprises a cup-shaped member secured to said housing and having said stem portion positioned therein.

14. The invention of claim 12 wherein said guide means comprises a bore formed in said housing and having said stem portion positioned therein.

15. The invention of claim 12 wherein said guide means comprises a spring positioned between said housing and said spool for normally urging said spool toward said first conically shaped seating means.